(12) United States Patent
    Weichenberger

(10) Patent No.: US 10,885,457 B2
(45) Date of Patent: Jan. 5, 2021

(54) QUANTUM OPTIMIZATION SYSTEM

(71) Applicant: Accenture Global Solutions Limited, Dublin (IE)

(72) Inventor: Jurgen Albert Weichenberger, Surrey (GB)

(73) Assignee: Accenture Global Solutions Limited, Dublin (IE)

( * ) Notice: Subject to any disclaimer, the term of this patent is extended or adjusted under 35 U.S.C. 154(b) by 768 days.

(21) Appl. No.: 15/466,147

(22) Filed: Mar. 22, 2017

(65) Prior Publication Data
    US 2018/0276555 A1    Sep. 27, 2018

(51) Int. Cl.
    *G06N 10/00*    (2019.01)
    *G06N 3/12*    (2006.01)

(52) U.S. Cl.
    CPC .............. *G06N 10/00* (2019.01); *G06N 3/126* (2013.01)

(58) Field of Classification Search
    CPC ................................ G06N 10/00; G06N 3/126
    See application file for complete search history.

(56) References Cited

U.S. PATENT DOCUMENTS

| 6,272,483 | B1 * | 8/2001 | Joslin | G06Q 10/06 706/62 |
| 2004/0156407 | A1 * | 8/2004 | Beausoleil | B82Y 10/00 372/43.01 |
| 2005/0273306 | A1 | 12/2005 | Hilton et al. | |
| 2008/0140749 | A1 * | 6/2008 | Amato | G06N 10/00 708/490 |
| 2008/0313114 | A1 | 12/2008 | Rose | |
| 2012/0254586 | A1 | 10/2012 | Amin et al. | |
| 2014/0187427 | A1 * | 7/2014 | Macready | G06N 7/005 505/170 |
| 2015/0024964 | A1 * | 1/2015 | Kauffman | B82Y 10/00 506/9 |
| 2017/0255872 | A1 * | 9/2017 | Hamze | G06F 9/02 |
| 2019/0164059 | A1 * | 5/2019 | Denchev | G06N 5/003 |

OTHER PUBLICATIONS

Lahoz-Beltra, Rafael. "Quantum genetic algorithms for computer scientists." Computers 5, No. 4 (2016): 24. (Year: 2016).*
Booth, M., S. P. Reinhardt, and A. Roy. "Partitioning optimization problems for hybrid classcal/quantum execution." (2017). (Year: 2017).*

(Continued)

*Primary Examiner* — Alexey Shmatov
*Assistant Examiner* — Casey R. Garner
(74) *Attorney, Agent, or Firm* — Fish & Richardson P.C.

(57) ABSTRACT

Apparatus and methods for solving global optimization tasks using quantum computing. In one aspect, a method includes receiving input data, the input data comprising (i) data representing one or more local solutions to the global optimization task, and (ii) data representing one or more task objectives; mapping the received input data to a quantum domain; performing a genetic algorithm on the mapped input data using the quantum computing device to obtain a solution to the global optimization task in the quantum domain; and obtaining a solution to the global optimization task in a classical domain by mapping the obtained solution to the global optimization task in the quantum domain to the classical domain.

20 Claims, 5 Drawing Sheets

(56) References Cited

OTHER PUBLICATIONS

Hogg, Tad, and Dmitriy Portnoy. "Quantum optimization." Information Sciences 128, No. 3-4 (2000): 181-197. (Year: 2000).*
Wang, Huaixiao, Jianyong Liu, Jun Zhi, and Chengqun Fu. "The improvement of quantum genetic algorithm and its application on function optimization." Mathematical problems in engineering 2013 (2013). (Year: 2013).*
Office Action issued in Australian Application No. 2018201944, dated Oct. 30, 2018, 8 pages.
Office Action issued in Australian Application No. 2018201944, dated Mar. 19, 2019, 4 pages.
'arxiv.org' [online]. "Genetic Algorithms and Quantum Computation," Mar. 4, 2004 [retrieved on Aug. 28, 2017]. Retrieved from the Internet: URL https://arxiv.org/pdf/cs/0403003.pdf>. 27 pages.
'arxiv.org' [online]. "Genetic Algorithms for Digital Quantum Simulations," [retrieved on Aug. 28, 2017. Retrieved from the Internet: URL https://arxiv.org/pdf/1512.00674.pdf. 6 pages.
'arxiv.org' [online]. "Modernizing Quantum Annealing II: Genetic Algorithms and Inference," Sep. 26, 2016 [retrived on Aug. 28, 2017]. Retrieved from the Internet: URL https://arxiv.org/pdf/1609.05875v2.pdf. 9 pages.
'arxiv.org' [online]. "Quantum Spin Systems," Sep. 2, 2004 [retrieved on Aug. 28, 2017]. Retrieved from the Internet: URL https://arxiv.org/pdf/math-ph/0409006.pdf. 10 pages.
Bodenhofer, "Genetic Algorithms: Theory and Applications—Lecture Notes," Third Edition, Winter 2003/2004, 126 pages.
Office Action issued in Australian Application No. 2018201944, dated May 29, 2018, 5 pages.

* cited by examiner

QUANTUM OPTIMIZATION SYSTEM

BACKGROUND

For some computational tasks, quantum computing devices may offer a computational speed up compared to classical devices. For example, quantum computers may achieve a speed up for tasks such as database search, evaluating NAND trees, integer factorization or the simulation of quantum many-body systems.

As another example, adiabatic quantum annealers may achieve a computational speed up compared to classical annealers for some optimization tasks. To perform an optimization task, quantum hardware may be constructed and programmed to encode the solution to a corresponding optimization task into an energy spectrum of a many-body quantum Hamiltonian characterizing the quantum hardware. For example, the solution is encoded in the ground state of the Hamiltonian.

SUMMARY

This specification describes technologies for solving optimization tasks using a hybrid classical—quantum optimization engine. The optimization engine includes a classical computing device that is configured to obtain local solutions to a constrained optimization task. The optimization engine further includes a quantum computing device that is configured to generate a global solution to the constrained optimization task using the local solutions. The quantum computing device generates the global solution to the constrained optimization task by performing a quantum genetic algorithm.

In general, one innovative aspect of the subject matter described in this specification can be embodied in a method for solving a global optimization task, performed by a classical processor and a quantum computing device, the method comprising: receiving, by the classical processor, input data, the input data comprising (i) data representing one or more local solutions to the global optimization task, and (ii) data representing one or more task objectives; mapping, by the classical processor, the received input data to a quantum domain; performing a genetic algorithm on the mapped input data using the quantum computing device to obtain a solution to the global optimization task in the quantum domain; and obtaining a solution to the global optimization task in a classical domain by mapping, using the classical processor, the obtained solution to the global optimization task in the quantum domain to the classical domain.

Other implementations of this aspect include corresponding classical or quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations performing the genetic algorithm on the mapped data using the quantum computing device comprises performing one or more genetic operations in the quantum domain, the genetic operations comprising (i) selection operations, (ii) mutation operations, and (iii) crossover operations.

In some implementations the quantum computing device comprises a plurality of interacting qubits arranged as a d-dimensional lattice, wherein a respective qubit is located at each lattice site, and wherein the qubits are realized by a spin.

In some implementations performing mutation operations in the quantum domain comprises allowing for the spontaneous spin change of a qubit.

In some implementations performing crossover operations in the quantum domain comprises manipulating ensembles of qubits.

In some implementations manipulating comprises rearranging.

In some implementations performing selection operations in the quantum domain comprises utilizing a transition function of quantum mechanics.

In some implementations performing the genetic algorithm on the mapped data using the quantum computing device comprises: initializing the quantum computing device using the mapped data; executing, by the quantum computing device, one or more of the genetic operations; and performing a measurement to obtain an observed solution to the optimization task in the quantum domain.

In some implementations performing the genetic algorithm using the quantum computing device to obtain an observed solution to the optimization task in the quantum domain comprises: performing the genetic algorithm using the quantum computing device N times to obtain N initial observed solutions to the optimization task in the quantum domain; and determining an observed solution to the optimization task based on a statistical mixture of the N initial observed solutions.

In some implementations the data representing one or more task objectives comprises data representing one or more global task objectives, and wherein the method further comprises: determining a global optimization function based on data representing the one or more global task objectives and data representing the one or more local solutions to the global optimization task; and applying a comparison function to the solution to the optimization task in the quantum domain and the global optimization function to determine a quality of the solution.

In some implementations performing the genetic algorithm using the quantum computing device comprises iteratively performing the genetic algorithm until a determined quality of an observed solution is above a predetermined threshold.

In some implementations mapping the received data to a quantum domain comprises encoding the received data into a quantum system included in the quantum computing device.

In some implementations the quantum system comprises one or more interacting qubits, and wherein encoding the received data into the quantum system comprises encoding the received data into the qubits and their interactions.

In some implementations mapping the obtained solution to the global optimization task in the quantum domain to the classical domain comprises mapping measured values of a current quantum state of the quantum system to parameter values of the global optimization task.

In some implementations local solutions to the global optimization task comprise solutions to sub-optimization tasks of the global optimization task.

In some implementations the task objectives comprise a global targets constraining solutions to the global optimization task.

In some implementations the quantum computing device comprises a plurality of interacting qubits, wherein the plurality of interacting qubits are arranged as a d-dimensional lattice, wherein a respective qubit is located at each lattice site, and wherein the qubits are realized by a spin.

In some implementations the quantum computing device comprises a quantum circuit.

In some implementations the quantum computing device comprises a quantum annealer.

The subject matter described in this specification can be implemented in particular embodiments so as to realize one or more of the following advantages.

Optimization tasks may be formulated as a task of minimizing (or maximizing) an objective function of variables with respect to the variables, i.e., finding a set of values of the variables that minimize (or maximize) the objective function. In some cases, an objective function to be minimized (or maximized) may include a large number of local minima (or maxima). In these cases, finding the global minimum (or maximum) of the objective function can be an extremely difficult and complex task. For example, even a seemingly simple task of finding an optimal configuration of biased binary variables scales exponentially with system size—optimizing a system of 100 hundred variables requires determining an optimal configuration from $2^{100}$ possible configurations.

A quantum optimization engine, as described in this specification, may be used to solve such optimization tasks. The quantum optimization engine combines classical computing processors with quantum computing processors, where the quantum computing processors are configured to perform a quantum genetic algorithm through application of quantum genetic operations—quantum selection, mutation and crossover operations. This functionality of the quantum computing processors increases the computational capabilities of the optimization engine compared to classical optimization engines. In some cases, the architecture and functionality of the quantum optimization engine may enable the quantum optimization engine to efficiently generate solutions to complex optimization tasks, including optimization tasks that are otherwise intractable using classical optimization engines.

A quantum optimization engine, as described in this specification, may be used to solve optimization tasks from a wide range of applications, including but not limited to machine learning, sampling/Monte Carlo, information security, pattern recognition, image analysis, systems design, mission planning, scheduling, and bioinformatics.

A quantum optimization engine, as described in this specification, may inherently be able to efficiently handle uncertainty due to the quantum nature of the optimization engine. For example, classical computing devices may be required to perform fuzzy logic or similar mathematical principles to handle uncertainty. The quantum optimization engine avoids the need to perform such mathematical principles, thus improving the accuracy and efficiency of the optimization engine compared to classical optimization engines. In addition, due to the quantum nature of the optimization engine described in this specification, the quantum optimization engine may simulate an infinite number of states and even find new states that are not classically discoverable, thus improving the accuracy and efficiency of the optimization engine compared to classical optimization engines.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Quantum computing devices are devices that use quantum mechanical phenomena, such as superposition and entanglement, to perform operations on data. For some computational tasks, quantum computing devices may offer an improvement in computational speed compared to classical computing devices. For example, quantum computers may achieve a polynomial improvement in speed (relative to classical computers) for tasks such as database search or evaluating NAND trees. As another example, adiabatic quantum annealers may achieve a computational improvement in speed compared to classical annealers for some optimization tasks.

Genetic algorithms can be used to solve optimization tasks. In a genetic algorithm, a population of candidate solutions to an optimization task is evolved toward better solutions. Each candidate solution has a set of properties which can be mutated and altered. Genetic algorithms apply three primary genetic operations—selection, mutation and crossover.

For example, a classical selection operation selects a subset of candidate solutions to an optimization task from a population of candidate solutions from the previous iteration according to a fitness-based process, where fitter solutions, as measured by a fitness or quality function, are more likely to be selected than less fit solutions. A classical crossover operation is analogous to reproduction and biological crossover, and varies the programming of a candidate solution to the optimization task from one iteration to the next. For example, a classical crossover operation may produce a candidate solution for a next iteration based on multiple candidate solutions for the current iteration, e.g., using methods for selection of chromosomes such as Boltzmann selection, tournament selection or fitness proportionate selection. A classical mutation operation is analogous to biological mutation, and is used to maintain the diversity of the populations of candidate solutions at each iteration by generating a random variable for each classical bit in a sequence of bits representing a candidate solution, the random variable indicating whether or not the corresponding bit is to be modified or not.

This specification describes methods and systems for finding global solutions to optimization tasks, e.g., global recommendations. The systems include one or more quantum computing devices that are provided with a new functionality—quantum genetic operations. The new functionality enables a quantum computing device to solve global optimization tasks.

Example Operating Environment

Figure 1A:
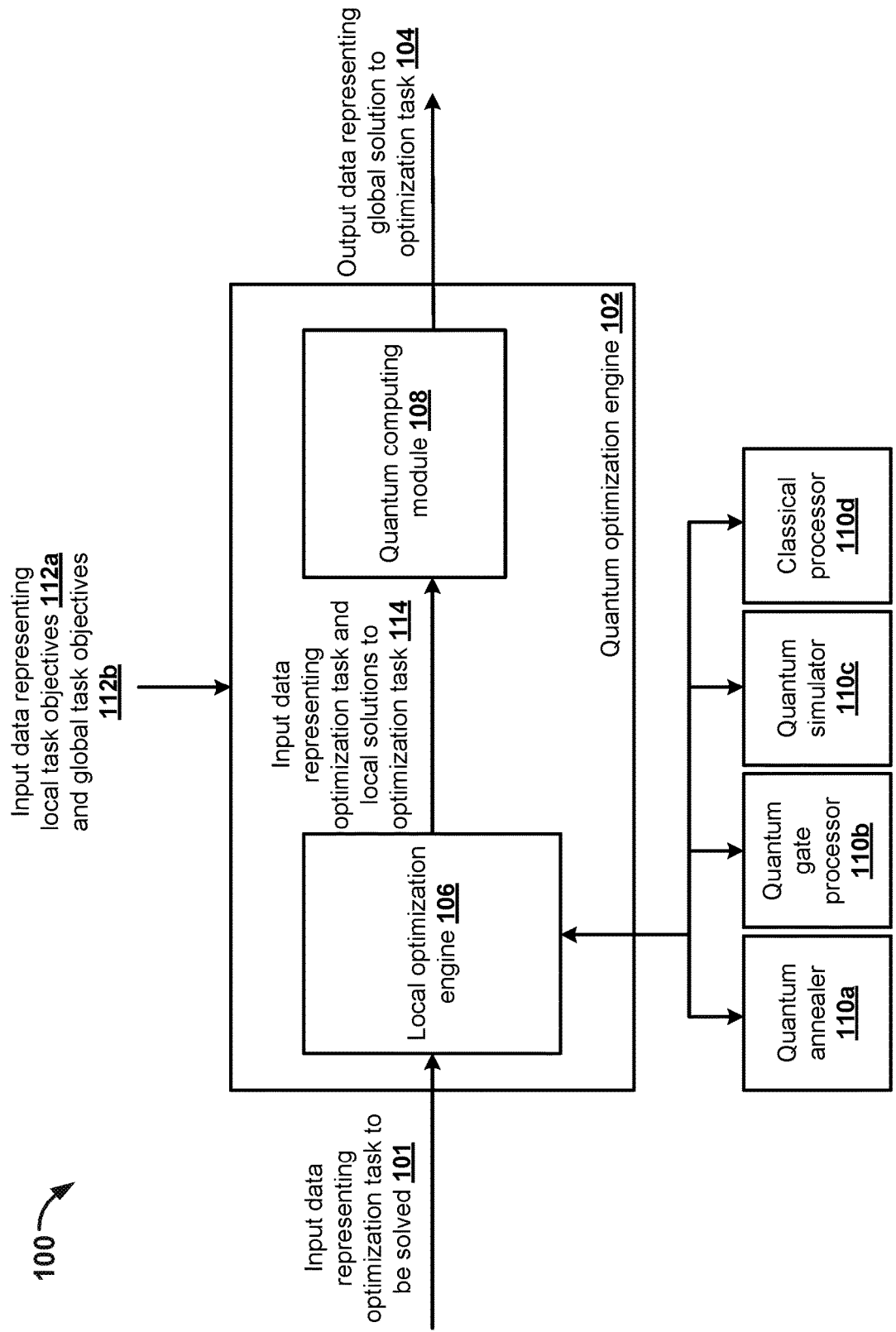
FIG. 1A depicts an example quantum optimization system for solving global optimization tasks.

FIG. 1A depicts an example quantum optimization system 100 for solving global optimization tasks. The quantum optimization system 100 is an example of a system implemented as computer programs on one or more classical or quantum computing devices in one or more locations, in which the systems, components, and techniques described below can be implemented.

The quantum optimization system 100 includes a quantum optimization engine 102 and one or more additional computing resources 110a-110d, e.g., quantum annealer 110a, quantum gate processor 110b, quantum simulator 110c and classical processor 110d. For convenience, four additional computing resources 110a-110d are shown in FIG. 1A, however in some implementations the quantum optimization system 100 may include more or fewer additional computing resources. The quantum optimization engine 102 is in data communication with each of the additional computing resources 110a-110d, e.g., through a communication network such as a local area network or wide area network.

The quantum optimization engine 102 is configured to receive as input data representing an optimization task to be solved, e.g., input data 101, and input data representing task objectives for the optimization task to be solved, e.g., input data 112a and 112b. The quantum optimization engine 102 is configured to process the received data inputs 101, 112a and 112b to generate as output data representing a global solution to the optimization task to be solved, e.g., output data 104.

The optimization task to be solved may be a task of finding a best solution to a problem from a set of feasible solutions. For example, the optimization task may be formulated as a task of minimizing (or maximizing) a function of multiple variables, $f(x)$, with respect to the multiple variables x, i.e., finding a set of values of each of the multiple variables x that minimizes (or maximizes) the function $f(x)$. In some implementations the values that a given variable may take may be discrete. In these implementations, the optimization task may be described as a combinatorial optimization task. In other implementations the values that a given variable may take may be continuous.

The task objectives may include one or more constraints for solving the optimization task. For example, a standard form of a continuous optimization task may be formulated by the below set of conditions:

$$\min_x \quad f(x)$$
$$\text{subject to} \quad \begin{array}{l} g_i(x) \leq 0, \quad i = 1, \ldots, m \\ h_j(x) = 0, \quad j = 1, \ldots, p \end{array}$$

where $f(x)$ represents an objective function to be minimized over the values of the variables x, and $g_i(x)$ and $h_j(x)$ represent inequality and equality constraints for the optimization task. For example, in cases where the optimization task is a travelling salesman problem, e.g., the optimization task may be formulated by "given a list of cities and the distances between each pair of cities, what is the shortest possible route that visits each city exactly once and returns to the origin city?", the travelling salesman problem may be formulated by the below set of conditions:

$$\min_x \quad \sum_{i=1}^{n} \sum_{j \neq i, j=1}^{n} c_{ij} x_{ij}$$

$$\text{subject to} \quad \begin{array}{ll} 0 \leq x_{ij} \leq 1, & i, j = 1, \ldots, n \\ u_i \in \mathbb{Z} & i, j = 1, \ldots, n \\ \sum_{i=1, i \neq j}^{n} x_{ij} = 1 & j = 1, \ldots, n \\ \sum_{j=1, i \neq j}^{n} x_{ij} = 1 & j = 1, \ldots, n \\ u_i - u_j + n x_{ij} \leq n-1 & 1 \leq i \neq j \leq n \end{array}$$

where the indices $1, \ldots, n$ represent the different cities, $x_{ij}=1$ if a path goes from city i to j, and $x_{ij}=0$ otherwise, $u_i$ represents a dummy variable, and $c_{ij}$ represents the distance from city i to city j.

The task objectives may include local task objectives and global task objectives. Global task objectives include global targets to be considered when solving the optimization task, e.g., a global objective of the solution to the optimization task. For example, global task objectives may be represented as a multi-dimensional spline or manifold, as described below with reference to FIG. 1B. Local task objectives include local targets to be considered when solving the optimization task, e.g., a local objective of the solution of the optimization task. For example, local objectives may include local constraints on subsets of the task variables and may be represented as projections of a multi-dimensional spline representing a global search space onto lower-dimensional, e.g., two-dimensional, base spaces, as described below with reference to FIG. 1B.

In some implementations, the input data representing an optimization task to be solved 101 may be data representing a global optimization task to be solved. A global optimization task is a computational task solved by finding a global minimum (or maximum) of a function of variables over all input values of the variables—as opposed to an optimization task that may be solved by finding one or more local minima (or maxima) of the function of variables over a subset of values of the variables. Example applications of global optimization tasks include, but are not limited to: protein structure prediction, where the optimization task to be solved is to minimize an energy function, computational phylogenetics, where the optimization task to be solved is to minimize a number of character transformations in a tree, travelling salesman problems, where the optimization task to be solved is to minimize path length, or safety engineering, where the optimization task to be solved is to optimize mechanical structures. Further applications include the tasks of labelling images, extracting meanings from text, detecting and tracking objects in images, finding correlations in bioinformatics data, or creating and testing scientific hypotheses.

The quantum optimization engine 102 includes a local optimization engine 106 and a quantum computing module 108. The local optimization engine 106 is configured to receive as input data representing an optimization task to be solved, e.g., input data 101, and input data representing local task objectives, e.g., input data 112a. The local optimization engine 106 is configured to process the received data to generate as output data representing one or more local solutions to the optimization task, e.g., local minima (or maxima) of an objective function for the optimization task.

Figure 1B:
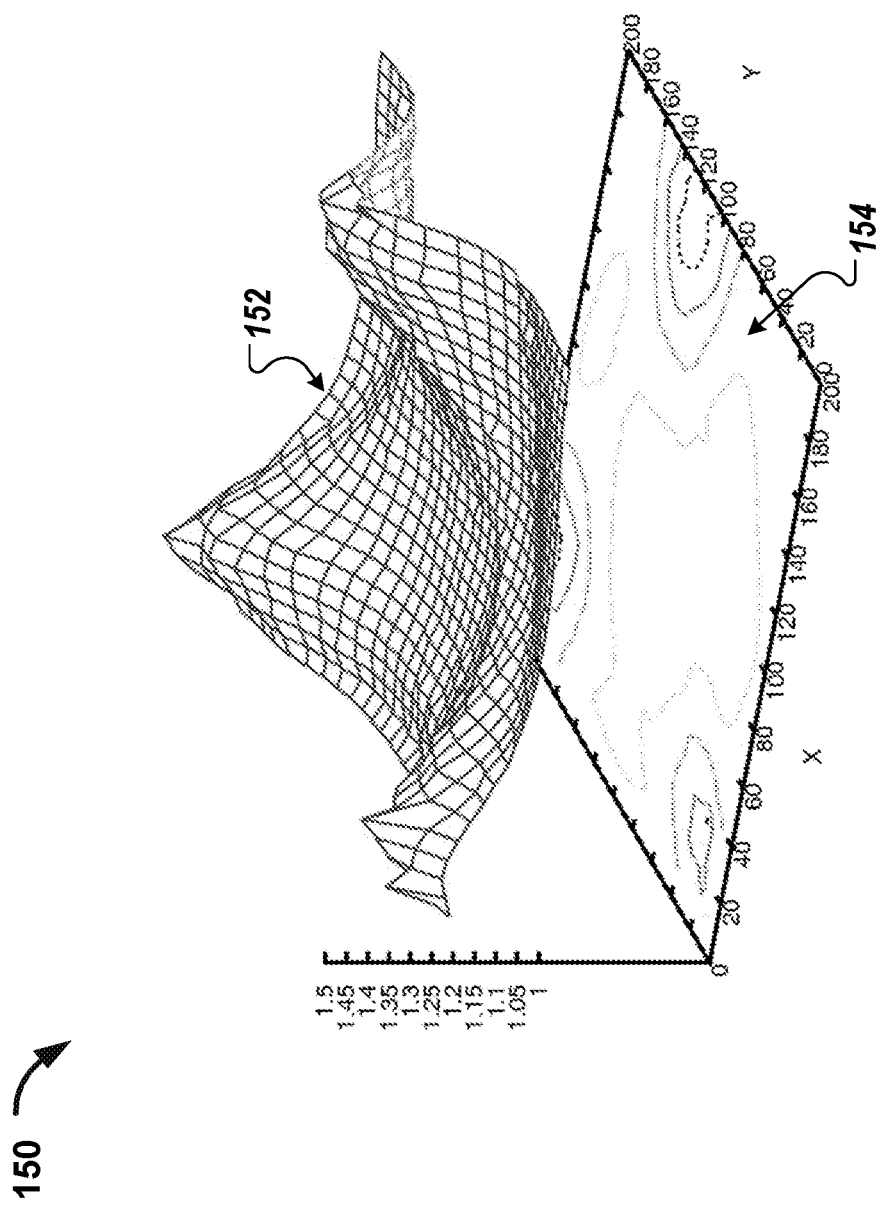
FIG. 1B depicts an example visualization of a global search space and a local search space.

In some implementations, local solutions to the optimization task include solutions to the optimization task that have been generated based on one or more local task objectives, as represented by input data 112a. In some implementations, local solutions to the optimization task include solutions to sub-tasks of the optimization task. For example, for an optimization task defined as minimizing an objective function $f(x)$ over a set of variables x, a sub-task task of the optimization task may include minimizing the objective function $f(x)$ over values of a subset of the variables x. That is, local solutions may include solutions that are optimal over a subspace, or local space, of a global search space of the optimization task. For example, a local space may be the result of a projection of a multi-dimensional spline representing the global search space to a two-dimensional base space. An example visualization 150 of a global search space and local space is shown in FIG. 1B. In FIG. 1B, multi-dimensional spline 152 represents a global search space, and two-dimensional base space 154 represents a local space.

In implementations where the objective function for the optimization task is a separable function, i.e., may be written as a product of functions of respective variables, a sub-task of the optimization task may include minimizing the functions of respective variables separately. Local solutions to the optimization task may include specific values of the set of multiple variables x, or may be probability distributions of values over the multiple variables x.

In some implementations, the local optimization engine 106 may process received input data representing an optimization task to be solved using one or more computing resources, e.g., classical processors, included in the local optimization engine 106 or included in the quantum optimization engine 102. In other implementations, the local optimization engine may process received input data representing an optimization task to be solved using one or more external computing resources, e.g., additional resources 110a-110d. For example, the local optimization engine 106 may be configured to analyze the received input data representing the optimization task to be solved and local task objectives, and outsource one or more computations associated with solving the optimization task based on the local task objectives to the additional computing resources 110a-110d.

The additional computing resources 110a-110d may include one or more quantum annealer computing resources, e.g., quantum annealer 110a. A quantum annealer is a device configured to perform quantum annealing—a procedure for finding the global minimum of a given objective function over a given set of candidate states using quantum tunneling. Quantum tunneling is a quantum mechanical phenomenon where a quantum mechanical system overcome localized barriers in the energy landscape which cannot be overcome by classically described system.

The additional computing resources 110a-110d may include one or more quantum gate processors, e.g., quantum gate processor 110b. A quantum gate processor includes one or more quantum circuits, i.e., models for quantum computation in which a computation is performed using a sequence of quantum logic gates, operating on a number of qubits (quantum bits).

The additional computing resources 110a-110d may include one or more quantum simulators, e.g., quantum simulator 110c. A quantum simulator is a quantum computer that may be programmed to simulate other quantum systems and their properties. Example quantum simulators include experimental platforms such as systems of ultracold quantum gases, trapped ions, photonic systems or superconducting circuits.

The additional computing resources 110a-110d may include one or more classical processors, e.g., classical processor 110d. In some implementations, the one or more classical processors, e.g., classical processor 110d, may include supercomputers, i.e., computers with high levels of computational capacity. For example, the classical processor 110d may represent a computational system with a large number of processors, e.g., a distributed computing system or a computer cluster.

Determining which, if any, computations to outsource to the additional computing resources 110a-110d is dependent on multiple factors, including the type of computations, current availability of the additional computing resources 110a-110d, cost of running the additional computing resources 110a-110d, and the type of optimization task. For example, in some cases an additional computing resource may be configured to perform only a limited number of specific computational tasks or types of computational tasks.

The quantum computing module 108 is configured to receive as input data representing local solutions to the optimization task, e.g., input data 114, from the local optimization engine 106. The quantum computing module 108 is also configured to receive input data representing global task objectives for the optimization task, e.g., input data 112b. The quantum computing module 108 processes the received input data 114 and 112b to generate as output, data representing a global solution to the optimization task, e.g., output data 104.

In some implementations, the number of local solutions to the optimization task may be large, and finding the global solution to the optimization task may be an extremely difficult and complex task. For example, even a seemingly simple task of finding an optimal configuration of biased binary variables scales exponentially with system size—optimizing a system of 100 hundred variables requires determining an optimal configuration from $2^{100}$ possible configurations. The quantum computing module 108 therefore includes one or more quantum computing devices that use quantum mechanical phenomena, such as superposition and entanglement, to process the received data and determine a global solution to the optimization task. The one or more quantum computing devices are configured to perform quantum genetic operations to determine the global solution to the optimization task. An example quantum computing device that uses quantum genetic operations to determine a global solution to an optimization task is described in more detail below with reference to FIG. 2.

Figure 2:
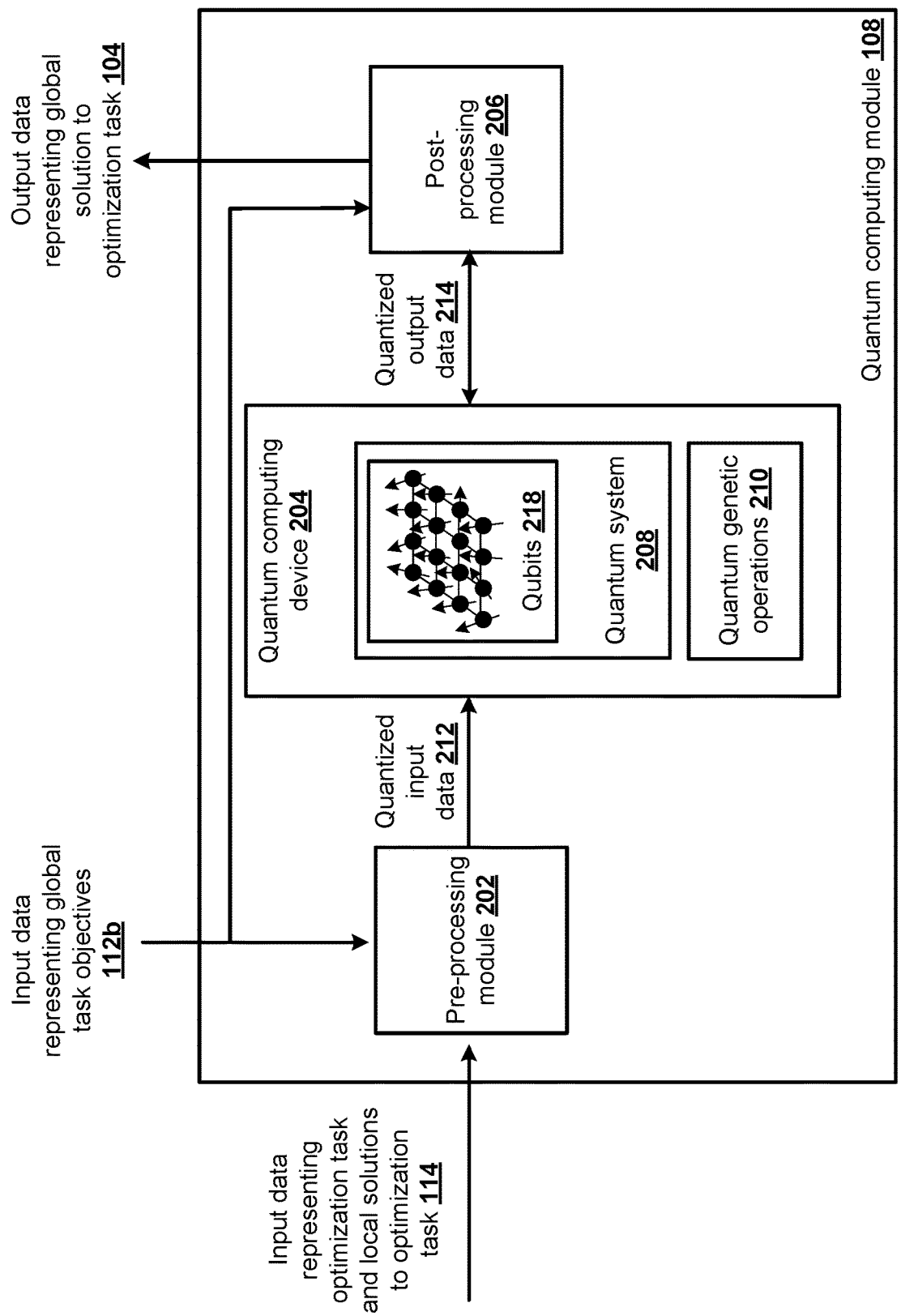
FIG. 2 depicts an example quantum computing module.

FIG. 2 depicts an example quantum computing module 108, as introduced above with reference to FIG. 1A. The quantum computing module 108 is an example of a system whose components may be implemented as computer programs on one or more classical or quantum computing devices in one or more locations, in which the systems, components, and techniques described below can be implemented.

The quantum computing module 108 includes a pre-processing module 202, quantum computing device 204 and post-processing module 206. For convenience, one quantum computing device 204 is shown in FIG. 2, however in some implementations the quantum computing module 108 may include multiple quantum computing devices.

The quantum computing module 108 is configured to receive as input, data representing an optimization task and local solutions to the optimization task, e.g., input data 114. In some implementations, as described above with reference to FIG. 1A, the quantum computing module 108 may receive data representing local solutions to an optimization task from a local recommendation engine. The quantum computing module 108 is further configured to receive as input data representing global task objectives for the optimization task, e.g., input data 112b. As described above with reference to FIGS. 1A and 1B, global task objectives may include global targets to be considered when solving the optimization task, e.g., global objectives of the solution to the optimization task, where a global target may be represented as a multi-dimensional spline 152 with reference to FIG. 1B. The quantum computing module 108 is configured to process the received input data 114 and 112b and generate as output, data representing a global solution to the optimization task, e.g., output data 104.

The quantum computing device 204 includes a quantum system 208. The quantum system 208 includes multiple interacting qubits 218, e.g., qubits that interact with other qubits through one or more controllable couplings. The type of physical realization of the qubits included in the quantum system 208 is dependent on multiple factors, including but not limited to the type of optimization tasks received by the quantum optimization engine. For example, in some implementations and as illustrated in FIG. 2, the multiple qubits included in the quantum system 208 may include qubits realized by spins, e.g., where spin up represents the qubit basis state |0> and spin down represents the qubit basis state |1>. In this example, the qubits 218 may be arranged as a d-dimensional lattice, where a respective qubit is located at each lattice site and each qubit interacts with its nearest neighbors. Interactions between the multiple spin qubits may be controlled via the application of external electromagnetic fields. Other example physical realizations of the qubits 218 included in the quantum system 208 may include qubits realized by two-level atoms or superconducting qubits.

The quantum computing device 204 is configured to operate on the qubits included in the quantum system 208 according to a quantum genetic algorithm that includes multiple quantum genetic operations 210. A classical genetic algorithm is an evolutionary algorithm inspired by the process of natural selection. A classical genetic algorithm may be used to generate solutions to optimization tasks using biologically-inspired classical operations, i.e., computational operations performed on classical bits. The classical operations include mutation, crossover and selection operations. During a classical genetic algorithm, a population of candidate solutions to an optimization task is iteratively evolved towards better solutions until a termination condition is reached. For example, the evolution may begin with an initial population of randomly generated solutions. The initial population of randomly generated solutions may then be improved through repetitive application of the classical mutation, crossover and selection operations. The evolution is terminated when a solution that satisfies some optimum criteria is found, e.g., after a fixed number of iterations or after an allocated computational budget is reached.

The quantum genetic algorithm performed by the quantum computing device 204 is an algorithm used to generate solutions to optimization tasks using quantum genetic operations 210, e.g., genetic operations performed on quantum bits (qubits). The quantum genetic operations 210 include quantum selection, mutation, and crossover operations. The quantum genetic algorithm may be iteratively performed until a termination condition is reached. For example, as described in more detail below, the quantum genetic algorithm may be performed until a quality of an obtained solution to the optimization task is above a predetermined quality threshold.

During each iteration of a classical genetic algorithm, the classical selection operation selects a subset of candidate solutions to the optimization task from a population of candidate solutions from the previous iteration. Individual solutions may be selected according to a fitness-based process, where fitter solutions, as measured by a fitness or quality function, are more likely to be selected than less fit solutions. For example, a fitness function may be a function of optimization task parameters that measures a quality of a solution to a global optimization task with respect to global optimization task objectives. An example fitness function is given below:

$$ExBIC = \alpha \log P(B^*|BN^{Ex}) + \log P(B^*|D) - \tfrac{1}{2} Dim(B^*) \log(n)$$

In the above equation, ExBIC represents a score function, $\alpha$ ranges from 0 to 1 and represents a prior weight of expert information, $B^*$ represents a candidate network, n represents a number of nodes in the candidate network, $BN^{Ex}$ represents an expert network, and D represents given data. In the above example fitness function, the example search space is small, however in mature genetic algorithms the fitness function may be an arbitrary n-dimensional function, e.g., comparable to a super symmetry function used to describe quantum loop theory.

The quantum selection operation included in the quantum genetic operations 210 selects a subset of candidate solutions to the optimization task from a population of candidate solutions from the previous iteration by utilizing the transition function of quantum mechanics. For example, in quantum theory the properties of a qubit, e.g., the spin of a qubit, is unknown until the point of measurement. By comparing multiple state observations of a qubit, a natural form of mutation is achieved without the need of applying mathematical selection process or function.

The classical crossover operation is analogous to reproduction and biological crossover, and varies the programming of a candidate solution to the optimization task from one iteration to the next. For example, the classical crossover operation may produce a candidate solution for a next iteration based on multiple candidate solutions for the current iteration, e.g., using methods for selection of chromosomes such as Boltzmann selection, tournament selection or fitness proportionate selection.

The quantum crossover operation included in the quantum genetic operations 210 varies the programming of a candidate solution to the optimization task at a particular iteration by manipulating a qubit ensemble constituting the quantum system 208 at the iteration. A qubit ensemble at a particular iteration represents an intermediate solution of the optimization task. The quantum crossover operation may therefore rearrange the ensemble of qubits by rearranging the space in which the qubits are arranged, e.g., an n-dimensional space, and thereby rearranging the structure of the ensemble. Rearranging may include, but is not limited to, folding, separating or stacking the ensemble of qubits. For example, one or more lasers may be applied to all or parts of the ensemble with varying intensity and/or wavelengths in order to restructure the ensemble, e.g., to separate or combine parts of the ensemble. In some cases the integrity of the ensemble, e.g., its quantumness and coherence, may be maintained using conventional techniques such as quantum state transfer.

In some implementations applying a quantum crossover operation to a candidate solution to the optimization task at a particular iteration may include applying a unitary operator U resulting from modeling the quantum system 208 of FIG. 2 as a non-commutative Markov chain, i.e., a Markovian approximation of a repeated atom-field interaction. For example, the change of an observable $X \in B(H)$, with $B(H)$ a Banach space of bounded operators on Hilbert space H, until time n compressed to H may be given by $Zn(X)=P\ H\ U(n)^* X \otimes 1\ U(n)|H$, with P a projection operator. Then, this, for an orthonormal basis $\varepsilon_j$ of the Hilbert space P and for $\xi \in H$, gives a unitary operator $U(\xi \otimes \Omega K)=A_j \xi \otimes \varepsilon_j j$, where $A_j \in B(H)$ and $\Omega$ is an auxiliary operator. Then $Zn(X) = A^*j_1 \ldots A^*j_n \times Aj_n \ldots Aj_1 = Zn(X), j_1, j_2, \ldots, j_n$ where $Z=j\ A^* j \cdot A_j : B(H) \to B(H)$ is a non-commutative transition operator which has the semigroup property of Markov processes. An example unitary operator is given below $$U = \begin{pmatrix} 1 & 0 & 0 & 0 \\ 0 & \sqrt{1-p} & -\sqrt{p} & 0 \\ 0 & \sqrt{p} & \sqrt{1-p} & 0 \\ 0 & 0 & 0 & 1 \end{pmatrix}, H = K = P = \mathbb{C}^2, 0 < p < 1.$$

In the above example, the two basis vectors of the Hilbert space P can be interpreted as "empty" and "occupied". The interaction then describes a photon changing to a free place with probability p.

The quantum computing module 108 may further leverage a quantum tunneling effect which allows the communication of qubits which are located in an n-dimensional folded space.

The classical mutation operation is analogous to biological mutation, and is used to maintain the diversity of the populations of candidate solutions at each iteration. For example, the classical mutation operation may generate a random variable for each classical bit in a sequence of bits representing a candidate solution, the random variable indicating whether or not the corresponding bit is to be modified or not. Mutation can enable the genetic algorithm to avoid local minima of an objective function representing the optimization function by preventing a population of candidate solutions from becoming too similar to each other.

The quantum mutation operation included in the quantum genetic operations 210 performs mutations by allowing for spontaneous changes of a qubit. For example, in cases where the quantum system 208 includes multiple interacting qubits 218 realized by spins, a quantum mutation operation may allow for a spontaneous change in spin. As another example, in cases where the quantum system 208 includes multiple interacting qubits 218 realized by superconducting qubits, e.g., flux qubits, a quantum mutation operation may allow for changes of current flow direction. As another example, in cases where the quantum system 208 includes multiple interacting qubits 218 realized by two-level atoms, a quantum mutation operation may allow for photon transfer.

The quantum genetic operations 210 may be used to solve the optimization task specified by input data 114 and to generate output data representing a global solution to the optimization task, e.g., output data 104. Since the quantum genetic operations 210 are quantum operations, i.e., operations that operate on qubits in the quantum domain, the quantum computing module 108 includes a pre-processing module 202 that is configured to receive the input data 114 and 112b, i.e., input data in the classical domain, and to pre-process the received data to generate quantized input data 212, i.e., input data in the quantum domain.

To generate the quantized data 212, the pre-processing module 202 is configured to map the received input data 112b and 114 representing the optimization task, local solutions and global objectives from its classical form, i.e., the form in which it is received, to the quantum system 208 and its degrees of freedom. Mapping input data to the quantum system 208 and its degrees of freedom includes mapping the input data to a state of the qubits 218 included in the quantum system 208 and their interactions. For example, quantizing the received data 112b and 114 may include mapping an objective function for the optimization task and its associated variables or parameters to corresponding parameters of the quantum system, e.g., coupling strengths or electromagnetic field strengths.

The exact mapping performed by the pre-processing module 202 is dependent on the type and specifics of the optimization task specified by the input data 114, the global task objectives specified by the input data 112b, and the type of quantum system 208 included in the quantum computing device 204. For example, in some implementations the pre-processing module 202 may include a general purpose quantum compiler that is configured to receive data specifying a computational task and translate the data specifying the computational task into a set of elementary computational operations that can be performed by the quantum computing device 204. For example, the pre-processing module 202 may be configured to generate an energy program, i.e., a quantum version of a classical logic program, from the received input data 112b and 114. The generated energy program may then be used to program the quantum computing device 204.

To perform the quantum genetic algorithm, the quantum computing device 204 is configured to receive the quantized input data 212 and prepare an initial quantum state of the quantum system 208 included in the quantum computing device 204 using the received quantized data. For example, in some implementations preparing an initial quantum state of the quantum system 208 may include setting the qubits 218 in an initial superposition state and using the quantized input data 212 to set quantum system parameters, e.g., coupling strengths or electromagnetic field strengths, to initial values.

The quantum computing device 204 is further configured to execute one or more of the genetic quantum operations 210 on the quantum system 208. After the one or more genetic quantum operations 210 have been executed, the quantum computing device 204 is configured to perform a measurement of the quantum state to obtain an observed solution to the optimization task in the quantum domain. For example, the quantum computing device 204 may include one or more measurement devices, e.g., one or more readout resonators, that are configured to measure properties of the quantum system. Optionally, the quantum computing device 204 may further include a classical processing component that is configured to receive measurement results from the one or more measurement devices and to interpret or translate the measurement results.

Due to the probabilistic nature of quantum mechanics, the quantum computing device 204 may be configured to perform the quantum genetic algorithm on the quantum system N times in order to obtain N initial observed solutions to the optimization task in the quantum domain. The quantum computing device 204 may be configured to then determine a final observed solution to the optimization task based on a statistical mixture of the N initial observed solutions.

As described above, the quantum genetic algorithm may be iteratively performed until a termination condition is reached. For example, the quantum computing device 204 may be configured to iteratively perform the quantum genetic algorithm, where at each iteration the quantum computing device 204 prepares an initial quantum state of the quantum system 208 for the iteration, executes one or more of the quantum genetic operations 210, and performs a measurement operation on the quantum system 208 to obtain an observed solution to the optimization task in the quantum domain for the iteration. An example iteration of the quantum genetic algorithm is described in more detail below with reference to FIG. 4.

The quantum computing module 108 includes a post-processing module 206 that is configured to receive output data representing the observed solution to the optimization task in the quantum domain, e.g., output data 214, and to process the received output data to generate a solution to the global optimization task in the classical domain. To generate the solution to the global optimization task in the classical domain, the post-processing module 206 is configured to map the received output data 214 from its current form, i.e., a classical measurement result representing a solution to the global optimization task in the quantum domain, to the classical domain, i.e., a form corresponding to the form in which the originally received input data 114 and 112b was represented. In this manner, the quantum computing module 108 is configured to generate as output a global solution to the optimization task that is meaningful and understandable to a user of the quantum optimization engine 102 described above with reference to FIG. 1A. In some implementations, mapping the received output data 214 in the quantum domain to data representing a global solution to the optimization task 104 includes applying an inverse of the mapping performed by the pre-processing module 202.

In some implementations the post-processing module 206 may be further configured to measure a quality of an observed global solution of the optimization task in the quantum domain. For example, the post-processing module 206 may be configured to compare received output data representing the global solution to the optimization task in the quantum domain to the input data representing the global task objectives 112b. Alternatively, in some cases, such as cases where the optimization task is of relatively low complexity, the post-processing module 206 may be configured to map received output data representing a global solution to the optimization task in the quantum domain to a corresponding global solution to the optimization task in the classical domain, and compare the data representing the global solution to the optimization task in the classical domain to the input data representing the global task objectives 112b.

For example, the post-processing module 206 may be configured to apply a comparison function to the data representing the global solution to the optimization task in the quantum or classical domain and data representing a global optimization function generated based on the input data 112b and 114. The post-processing module 206 may then be configured to determine a quality of the global solution to the optimization task in the quantum or classical domain based on a result of the comparison function. The comparison function may be a function suitable for comparing values of optimization task parameters. An example comparison function in the quantum domain is a Feynman state matrix.

For example, in some cases, determining the quality of the global solution to the optimization task in the quantum or classical domain may include determining whether the quality is above a predetermined threshold. For example, the post-processing module 206 may determine whether a result of the comparison function exceeds a predetermined threshold, e.g., a 99% quality threshold.

In response to determining that the quality is above the predetermined threshold, the post-processing module 206 may be configured to provide as output data representing the global solution to the optimization task in the classical domain. As described above, this may include first mapping the global solution to the optimization task in the quantum domain to the classical domain, e.g., if the comparison function was applied to the global solution in the quantum domain.

In response to determining that the quality is not above the predetermined threshold, the post-processing module 206 may be configured to cause the quantum computing device 204 to perform a subsequent iteration of the quantum genetic algorithm. In response to determining that the quality is above the predetermined threshold, the post-processing module 206 may be configured to output data representing the global solution to the optimization task, e.g., output data 104. Due to the probabilistic nature of quantum mechanics, the global solution to the optimization task may not be a true global solution to the optimization task. Rather, it is highly likely that the solution provided by the quantum computing module is of a high quality in terms of accuracy. An example method for obtaining a global solution to an optimization task using a quantum computing device configured to execute quantum genetic operations is described in more detail below with reference to FIG. 3.

Programming the Hardware

Figure 3:
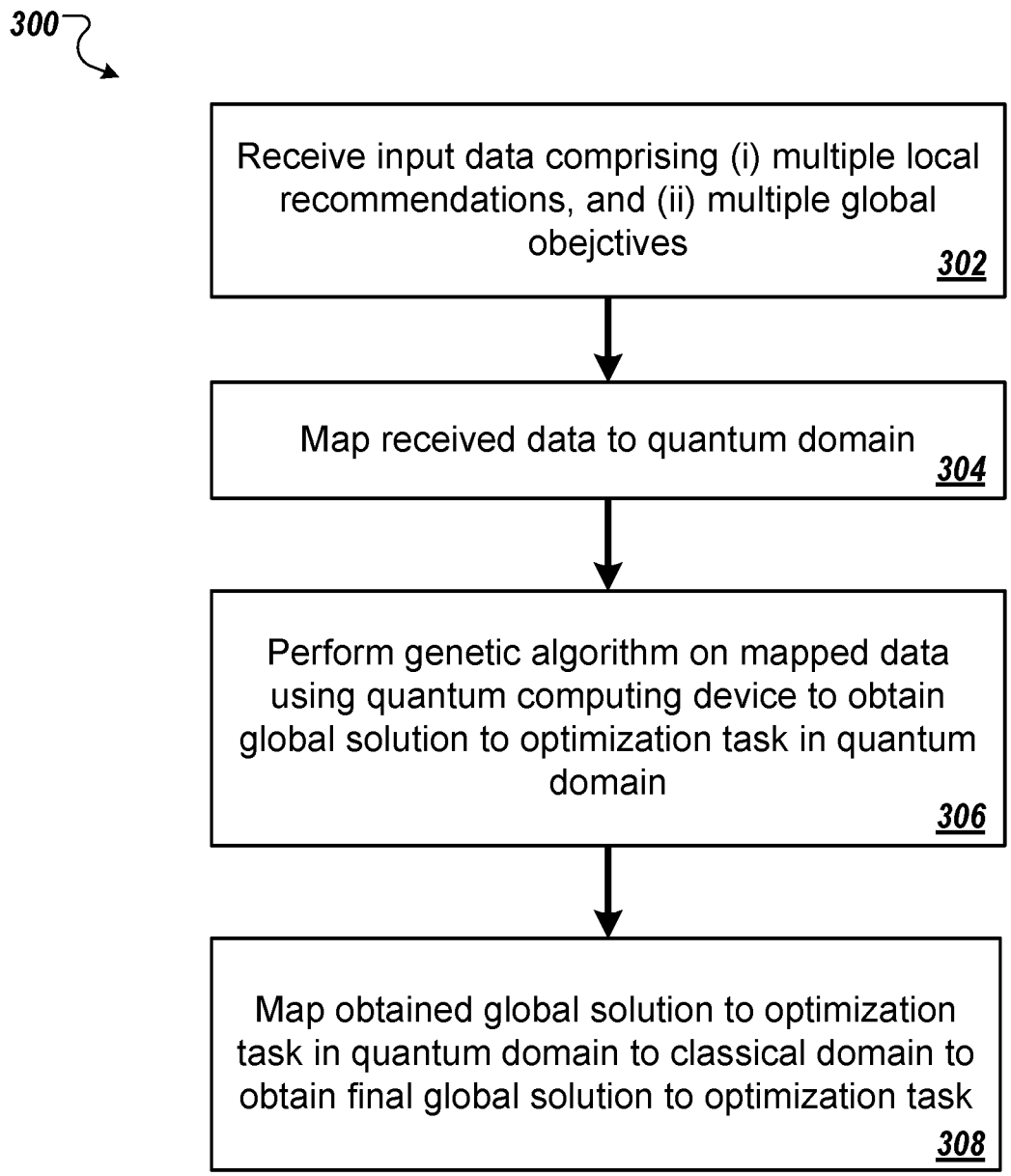
FIG. 3 is a flow chart of an exemplary process for solving a global optimization task using a quantum computing device implementing a quantum genetic algorithm.

FIG. 3 is a flowchart of an exemplary process 300 for solving a global optimization task using a quantum computing device implementing a quantum genetic algorithm. For example, the process 300 may be performed by the quantum computing module 108 of system 100 described above with reference to FIG. 1A.

The system receives input data (step 302). The input data includes (i) data representing one or more local solutions to the global optimization task, and (ii) data representing one or more global task objectives. In some implementations, the local solutions to the global optimization task may include solutions to sub-optimization tasks of the global optimization task. For example, the local solutions to the global optimization task may include one or more local minima of an objective function representing the optimization task. In some implementations, the global task objectives may include global targets constraining solutions to the global optimization task. Together, some or all of the data representing the one or more local solutions to the global optimization task and the data representing the one or more global task objectives may be combined to generate a global optimization function that may be used to determine a quality of an obtained solution to the optimization task, as described in more detail below with reference to FIG. 4.

The system maps the received input data to a quantum domain (step 304). As described above with reference to FIG. 2, in some implementations mapping the received data to a quantum domain includes encoding the received data into a quantum system included in the quantum computing device. For example, in cases where the quantum system includes one or more interacting qubits, the system may encode the received data into the quantum system by mapping the received data to parameters representing the qubits and their interactions.

The system performs a genetic algorithm on the mapped input data using the quantum computing device to obtain a solution to the global optimization task in the quantum domain (step 306). Performing the quantum genetic algorithm may include preparing a quantum system of qubits included in the quantum computing device in an initial state, and performing one or more quantum genetic operations in the quantum domain on the mapped input data using the quantum computing device.

The quantum genetic operations may include quantum selection operations. As described above with reference to FIG. 2, a quantum selection operation is an operation that selects a subset of candidate global solutions to the optimization task from a set of candidate solutions utilizing the transition function of quantum mechanics.

The quantum genetic operations may further include quantum mutation operations. As described above with reference to FIG. 2, a quantum mutation operation is an operation that mutates candidate global solutions to the optimization task by allowing for spontaneous changes of qubits included in the quantum computing device. For example, in cases where the quantum computing device includes a quantum system of multiple interacting qubits realized by spins, e.g., arranged as a d-dimensional lattice with a respective qubit located at each lattice site, a quantum mutation operation may allow for a spontaneous change in spin.

The quantum genetic operations may further include quantum crossover operations. As described above with reference to FIG. 2, a quantum crossover operation is an operation that varies the programming of a candidate solution to the optimization task by manipulating a qubit ensemble constituting the quantum system included in the quantum computing device. For example, the quantum crossover operation may rearrange, i.e., fold, stack or separate, the ensemble of qubits.

To obtain the solution to the global optimization task in the quantum domain, the system performs a measurement of the quantum system included in the quantum computing device to determine a current quantum state of the quantum system after one or more of the quantum genetic operations have been performed. In some implementations, the system may perform the quantum genetic algorithm using the quantum computing device N times to obtain N initial observed solutions to the global optimization task in the quantum domain. The system may then determine an observed solution to the optimization task based on a statistical mixture of the N initial observed solutions.

The system obtains a solution to the global optimization task in a classical domain by mapping the obtained solution to the global optimization task in the quantum domain to the classical domain (step 308). In some implementations, the system maps the obtained solution to the global optimization task in the quantum domain to the classical domain by mapping measured values of a current quantum state of the quantum system to parameter values of the global optimization task.

In some implementations, the system may iteratively perform steps 306 and 308 described above until a determined quality of a solution to the optimization task in the classical domain is above a predetermined threshold. An example iteration of generating a solution to an optimization task in the classical domain is described in more detail below with reference to FIG. 4.

Figure 4:
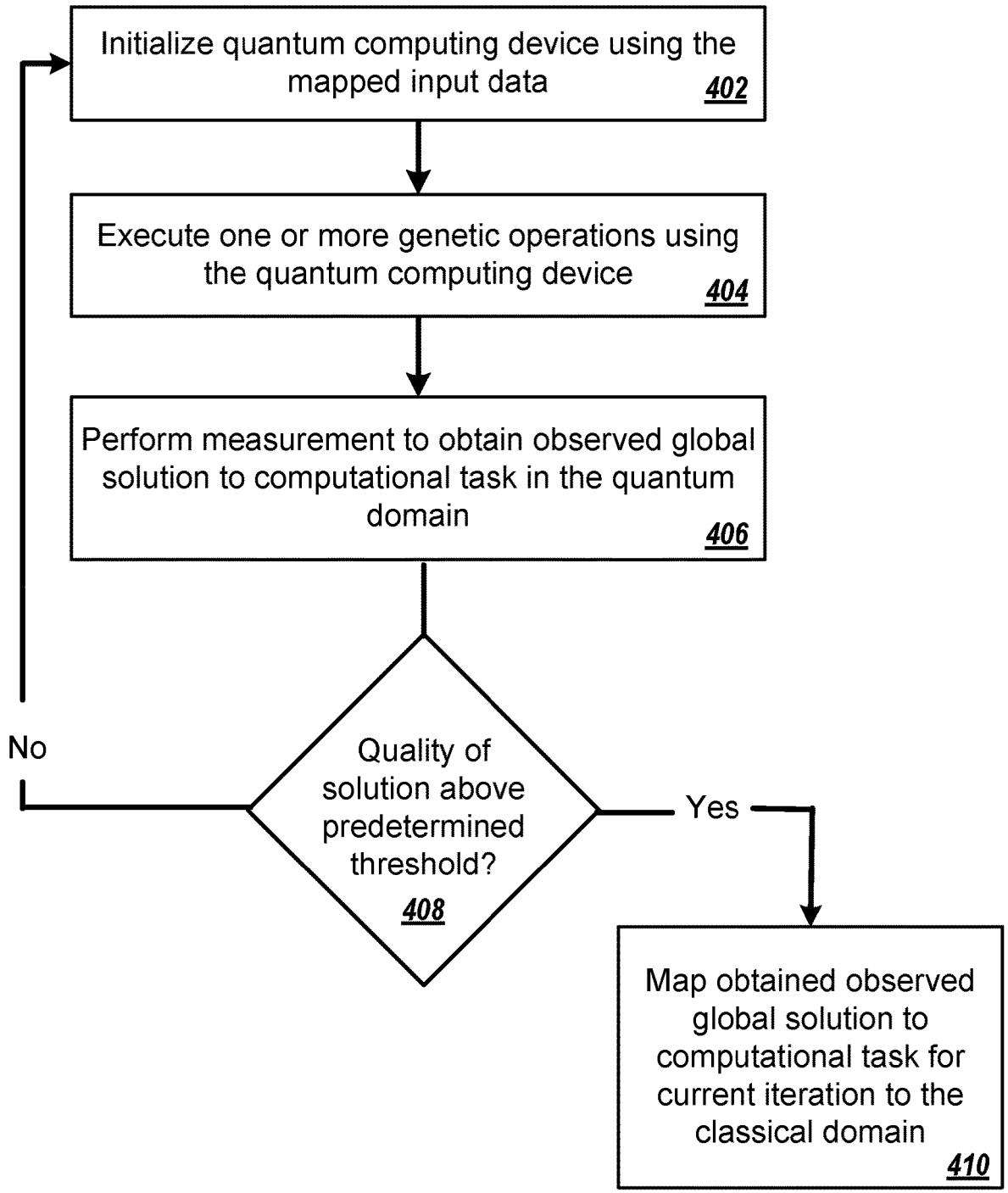
FIG. 4 is a flowchart of an example iteration of a process for solving a global optimization task using a quantum computing device implementing a quantum genetic algorithm.

FIG. 4 is a flowchart of an example iteration 400 of the process 300 for solving a global optimization task using a quantum computing device implementing a quantum genetic algorithm. For example, the process 400 may be performed by the quantum computing device 204 of the quantum computing module 108 described above with reference to FIGS. 1 and 2.

The system initializes the quantum computing device using the mapped input data (step 402). As described above with reference to FIG. 2, initializing the quantum computing device may include preparing an initial state of a quantum system included in the quantum computing device, e.g., preparing the quantum system in a superposition state, and setting quantum system parameters to initial values.

The system executes, by the quantum computing device, one or more of the quantum genetic operations (step 404). As described above with reference to FIG. 2, executing one or more quantum genetic operations includes performing one or more of the quantum genetic operations on the quantum system included in the quantum computing device.

The system performs a measurement to obtain an observed solution to the optimization task in the quantum domain (step 406). As described above with reference to FIG. 2, performing a measurement to obtain an observed solution to the optimization task in the quantum domain includes determining a current quantum state of the quantum system after one or more of the quantum genetic operations have been performed. The measurement result, i.e., the obtained observed solution to the optimization task, is a classical quantity, e.g., a set of real numbers, which represents a solution to the global optimization task in the quantum domain.

As described above with reference to step 306 of FIG. 3, in some implementations the system may perform steps 402-406 N times to obtain N initial observed solutions to the optimization task in the quantum domain. The system may then determine an observed solution to the optimization task based on a statistical mixture of the N initial observed solutions.

The system determines whether a quality of the observed solution to the optimization task in the quantum domain is above a predetermined threshold (step 408). For example, the system may translate the observed solution to the optimization task in the quantum domain to a solution to the optimization task in the classical domain, as described above with reference to FIG. 3, and apply a comparison function between the solution to the optimization task in the classical domain and global objectives for the optimization task.

If the result of the comparison function is below a predetermined quality threshold, e.g., the comparison function indicates that the solution to the optimization task in the classical domain and global objectives for the optimization task are not similar enough, the system may determine that the quality of the solution is not sufficient. In this case, the system may repeat steps 402-410 as described above.

If the result of the comparison function is above a predetermined quality threshold, e.g., the comparison function indicates that the solution to the optimization task in the quantum domain and global objectives for the optimization task are sufficiently similar, the system may determine that the quality of the solution is sufficient. The system may then map the solution to the optimization task from the classical domain to the quantum domain (step 410), and provide the solution in the classical domain as output.

Embodiments of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Embodiments of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof both.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for solving a global optimization task, performed by a classical processor and a quantum computing device comprising a plurality of interacting qubits, the method comprising:
    processing, by the classical processor, i) data representing the global optimization task, and ii) data representing one or more local task objectives, to generate local solution data representing one or more local solutions to the global optimization task;
    receiving, by the classical processor, data representing one or more global task objectives;
    mapping, by the classical processor, i) the local solution data representing one or more local solutions to the global optimization task, and ii) the received data representing one or more global task objectives, to a quantum domain;
    performing a genetic algorithm on the mapped data using the quantum computing device to obtain a solution to the global optimization task in the quantum domain, wherein performing the genetic algorithm on the mapped data using the quantum computing device comprises performing one or more genetic operations in the quantum domain, the generic genetic operations comprising mutation operations, wherein performing a mutation operation in the quantum domain comprises, during the performing of the mutation operation, enabling spontaneous changes of one or more of the plurality of interacting qubits; and
    obtaining a solution to the global optimization task in a classical domain by mapping, using the classical processor, the obtained solution to the global optimization task in the quantum domain to the classical domain.

2. The method of claim 1, wherein the genetic operations further comprise selection operations and crossover operations.

3. The method of claim 2, wherein performing crossover operations in the quantum domain comprises manipulating ensembles of qubits, wherein manipulating comprises rearranging.

4. The method of claim 2, wherein performing selection operations in the quantum domain comprises utilizing a transition function of quantum mechanics.

5. The method of claim 1, wherein the plurality of interacting qubits are arranged as a d-dimensional lattice, wherein a respective qubit is located at each lattice site, and wherein the plurality of interacting qubits are realized by a spin.

6. The method of claim 5, wherein performing the mutation operation in the quantum domain comprises, during the performing of the mutation operation, enabling spontaneous changes of qubit spin.

7. The method of claim 1, wherein performing the genetic algorithm on the mapped data using the quantum computing device comprises:
   initializing the quantum computing device using the mapped data;
   executing, by the quantum computing device, one or more of the genetic operations; and
   performing a measurement to obtain an observed solution to the global optimization task in the quantum domain.

8. The method of claim 7, wherein performing the genetic algorithm using the quantum computing device to obtain an observed solution to the optimization task in the quantum domain comprises:
   performing the genetic algorithm using the quantum computing device N times to obtain N initial observed solutions to the optimization task in the quantum domain; and
   determining an observed solution to the optimization task based on a statistical mixture of the N initial observed solutions.

9. The method of claim 1, wherein the method further comprises:
   determining a global optimization function based on the data representing the one or more global task objectives and the data representing the one or more local solutions to the global optimization task; and
   applying a comparison function to the solution to the global optimization task in the quantum domain and the global optimization function to determine a quality of the solution.

10. The method of claim 9, wherein performing the genetic algorithm using the quantum computing device comprises iteratively performing the genetic algorithm until a determined quality of an observed solution is above a predetermined threshold.

11. The method of claim 1, wherein mapping, i) the local solution data representing one or more local solutions to the global optimization task, and ii) the received data representing one or more global task objectives, to the quantum domain comprises encoding i) the local solution data representing one or more local solutions to the global optimization task, and ii) the received data representing one or more global task objectives into a quantum system included in the quantum computing device.

12. The method of claim 11, wherein encoding the local solution data into the quantum system comprises encoding the local solution data into the plurality of interacting qubits and their interactions.

13. The method of claim 11, wherein mapping the obtained solution to the global optimization task in the quantum domain to the classical domain comprises mapping measured values of a current quantum state of the quantum system to parameter values of the global optimization task.

14. The method of claim 1, wherein local solutions to the global optimization task comprise solutions to sub-optimization tasks of the global optimization task.

15. The method of claim 1, wherein the global task objectives comprise global targets target constraining solutions to the global optimization task.

16. The method of claim 1, wherein the plurality of interacting qubits comprise qubits realized by superconducting qubits, and wherein performing a mutation operation in the quantum domain comprises, during the performing of the mutation operation, enabling spontaneous changes of current flow direction.

17. The method of claim 1, wherein the plurality of interacting qubits comprise qubits realized by two-level atoms, and wherein performing a mutation operation in the quantum domain comprises, during the performing of the mutation operation, enabling spontaneous photon transfer.

18. A system comprising:
   a classical processor;
   a quantum computing device comprising a plurality of interacting qubits;
   wherein the classical processor and quantum computing device are configured to perform operations comprising:
      processing, by the classical processor, i) data representing a global optimization task, and ii) data representing one or more local task objectives, to generate local solution data representing one or more local solutions to the global optimization task;
   receiving, by the classical processor, data representing one or more global task objectives;
   mapping, by the classical processor, i) the local solution data representing one or more local solutions to the global optimization task, and ii) the received data representing one or more global task objectives, to a quantum domain;
   performing a genetic algorithm on the mapped data using the quantum computing device to obtain a solution to the global optimization task in the quantum domain, wherein performing the genetic algorithm on the mapped data using the quantum computing device comprises performing one or more genetic operations in the quantum domain, the generic genetic operations comprising mutation operations, wherein performing a mutation operation in the quantum domain comprises, during the performing of the mutation operation, enabling spontaneous changes of one or more of the plurality of interacting qubits; and
   obtaining a solution to the global optimization task in a classical domain by mapping, using the classical processor, the obtained solution to the global optimization task in the quantum domain to the classical domain.

19. The system of claim 18, wherein the plurality of interacting qubits are arranged as a d-dimensional lattice, wherein a respective qubit is located at each lattice site, and wherein the qubits are realized by a spin.

20. The system of claim 18, wherein the quantum computing device comprises a quantum circuit or a quantum annealer.

* * * * *

UNITED STATES PATENT AND TRADEMARK OFFICE
CERTIFICATE OF CORRECTION

Page 1 of 1

PATENT NO. : 10,885,457 B2
APPLICATION NO. : 15/466147
DATED : January 5, 2021
INVENTOR(S) : Jurgen Albert Weichenberger It is certified that error appears in the above-identified patent and that said Letters Patent is hereby corrected as shown below:

On the Title Page

Item (56), Column 2 (Other Publications), Line 4, delete "classcal/" and insert -- classical/ --, therefor.

In the Claims

In Claim 15, Column 22, Line 2, delete "target", therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*